United States Patent [19]

Suzuki et al.

[11] Patent Number: 4,572,658
[45] Date of Patent: Feb. 25, 1986

[54] VARIABLE MAGNIFICATION IMAGING DEVICE FOR COPIER

[75] Inventors: Shigeru Suzuki, Yokohama; Yuji Yasuda, Kawasaki, both of Japan

[73] Assignee: Ricoh Company, Ltd., Tokyo, Japan

[21] Appl. No.: 532,327

[22] Filed: Sep. 15, 1983

[30] Foreign Application Priority Data

Sep. 17, 1982 [JP] Japan .................................. 57-161908

[51] Int. Cl.$^4$ ............................................. G03B 27/34
[52] U.S. Cl. ......................................................... 355/57
[58] Field of Search .................. 355/8, 11, 49, 57, 65, 355/66, 58, 59, 60

[56] References Cited

U.S. PATENT DOCUMENTS 4,457,616 7/1984 Tokuhara ................................. 355/8

Primary Examiner—L. T. Nix
Assistant Examiner—Brian W. Brown
Attorney, Agent, or Firm—David G. Alexander

[57] ABSTRACT

A variable magnification imaging device for a copier employs a swingable mirror assembly and a cam and follower mechanism for regulating the angular position of the mirror assembly. As a carriage supporting a lens thereon moves along an optical axis toward and away from the mirror assembly, the mirror assembly is caused to swing automatically to a desired magnification position through a parallelogram link mechanism, while having its angular position properly regulated by the cam and follower mechanism.

14 Claims, 6 Drawing Figures

VARIABLE MAGNIFICATION IMAGING DEVICE FOR COPIER

BACKGROUND OF THE INVENTION

The present invention relates to a variable magnification imaging device for a copying machine which has a lens and a mirror disposed one after the other in an optical path which terminates at a photoconductor.

A variable magnification imaging device for the above-mentioned application includes a lens assembly and a mirror assembly disposed in an optical path which extends from an original document on a transparent platen to a photoconductor. Various systems have heretofore been proposed to attain a plurality of alternative magnifications: shifting the lens and mirror assemblies to a desired magnification position, varying the focal length of the lens assembly while shifting it, or selectively using different lenses for different magnifications while shifting the mirror assembly or using another mirror assembly. In this type of imaging device, the mirror assembly is guided by rods to slide therealong to a predetermined position when the magnification is to be changed.

However, the imaging device with the slide type mirror assembly requires a substantial driving force to perform reciprocation between different magnification positions. The inherent position of the mirror assembly limits the accessibility thereto and thereby makes it difficult to clean or otherwise maintain the mirrors. Moreover, the slide mechanism for the mirror assembly has to be machined and assembled with significant accuracy at the sacrifice of costs.

SUMMARY OF THE INVENTION

It is therefore an object of the present invention to provide a variable magnification imaging device for a copier which is reliable in operation.

It is another object of the present invention to provide a variable magnification imaging device for a copier which is economical to produce.

It is another object of the present invention to provide a variable magnification imaging device for a copier which allows a mirror assembly therefore to be operated by a reduced magnitude of force and accessed with ease for maintenance.

It is another object of the present invention to provide a generally improved variable magnification imaging device for a copier.

In one aspect of the present invention, there is provided a variable magnification imaging device for a copying machine which defines a variable length optical path extending from an original document laid on a transparent platen to a predetermined area on a photoconductor member. The imaging device comprises a mirror, parallelogram linkage means defined by a first axis perpendicular to the optical path, a second axis parallel to and pivotable about the first axis, a third axis parallel to the first axis, and a fourth axis parallel to and pivotable about the third axis, the linkage means carrying the mirror therewith, and drive means for driving the linkage means to shift the mirror to a position which establishes one of a plurality of alternative magnifications.

In another aspect of the present invention, there is provided a variable magnification imaging device for a copying machine which defines a variable length optical path extending from an original document laid on a transparent platen to a predetermined image area on a photoconductor. The imaging device comprises a member swingable toward and away from a predetermined position about a first axis which is perpendicular to the optical path, the swingable member being constantly biased toward the predetermined position, a mirror support member pivotally supported by the swingable member and constantly biased substantially in the same direction as the swingable member about a second axis which is parallel to the first axis, the mirror support member supporting a mirror for reflecting the light from the original document toward the image area on the photoconductor, and means for regulating an angular position of the mirror support member relative to the optical path, whereby the swingable member swings to move the mirror on the mirror support member along the optical path and in a regulated angular position to a location which establishes selected one of a plurality of alternative magnifications.

In accordance with the present invention, a variable magnification imaging device for a copier employs a swingable mirror assembly and a cam and follower mechanism for regulating the angular position of the mirror assembly. As a carriage supporting a lens thereon is moved along an optical axis toward and away from the mirror assembly, the mirror assembly swings automatically to a desired magnification position through a parallelogram link mechanism, while having its angular position regulated by the cam and follower mechanism.

The above and other objects, features and advantages of the present invention will become apparent from the following detailed description taken with the accompanying drawings.

DESCRIPTION OF THE PREFERRED EMBODIMENT

While the variable magnification imaging device for a copier of the present invention is susceptible of numerous physical embodiments, depending upon the environment and requirements of use, a substantial number of the herein shown and described embodiment have been made, tested and used, and all have performed in an eminently satisfactory manner.

Figure 1:
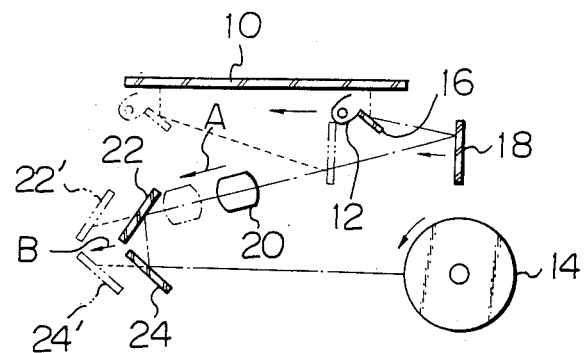
FIG. 1 is a schematic view of a copier to which the present invention is applicable.

Before entering into a detailed discussion of the present invention, construction and operation of a copier with an imaging device of the type concerned will be outlined with reference to FIG. 1.

The copier in FIG. 1 includes a transparent platen 10 on which a desired original document (not shown) is laid. A light source 12 is located below the platen 10 to scan the document while moving therealong. The document scan speed of the light source 12 is variable in accordance with a selected magnification, or optical rate, and a rotation speed of a photoconductor drum 14. A mirror 16 moves integrally with the light source 12, while a mirror 18 moves at a speed one half the moving speed of the mirror 16. The image light reflected from the document on the platen 10 is focused to the drum 14 via the mirrors 16 and 18, a lens 20 and other mirror elements 22 and 24.

The lens 20 is movable to set up a desired magnification, in a direction indicated by an arrow A for reduction and in the opposite direction for enlargement. Simultaneously, the mirrors 22 and 24 are movable in a direction indicated by an arrow B to positions 22' and 24' so as to increase the total length of the optical path from the document surface to the drum 14. Thus, the imaging system is such that for a magnification other than 1:1, the length of the optical path is made longer than the minimum length which provides the 1:1 magnification.

Figure 2:
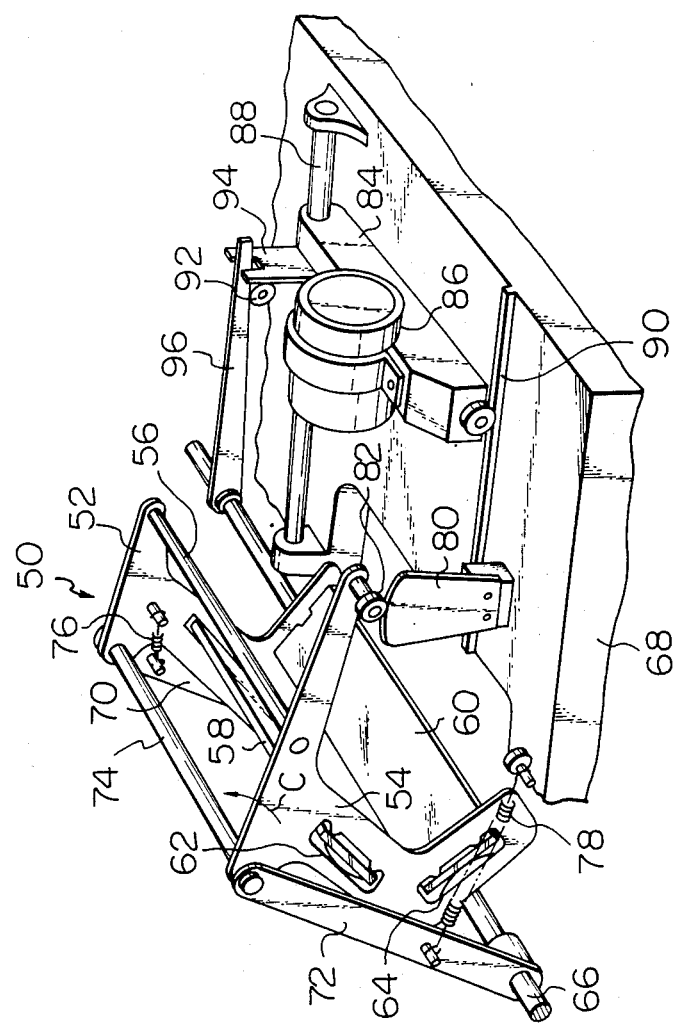
FIG. 2 is a perspective view of a variable magnification imaging device embodying the present invention.

Referring to FIG. 2, a variable magnification imaging device embodying the present invention is shown and includes a mirror support assembly, generally 50. The mirror support 50 comprises a pair of side plates 52 and 54 which are interconnected by a tie rod or stay 56. Mirrors 58 and 60, corresponding to the mirrors 22 and 24 shown in FIG. 1, are individually supported by the side plates 52 and 54 and secured thereto by leaf springs 62 and 64, respectively. A shaft 66 is rotatably supported by an optics bracket 68. A pair of parallel arms 70 and 72 are rigid on the shaft 66 at their one end, constituting a generally U-shaped frame member. The other or free end of the arms 70 and 72, as well as the mirror support 50, are individually pivotted to a shaft 74 in the illustrated manner. A tension spring 76 is anchored at one end to the mirror support side plate 52 and at the other end to the arm 70 associated therewith, so that the mirror support 50 is bodily biased clockwise about the shaft 74 as seen in FIG. 2. A second tension spring 78 is anchored at one end to the bracket 68 and at the other end to the other arm 72, thereby constantly biasing the arms 70 and 72 and thereby the shaft 66 clockwise. The clockwise movement of the mirror support and that of the shaft 66 are individually limited by members which will be described.

A contoured cam member 80 is mounted upright on the bracket 68. A cam follower in the form of a roller 82 is journalled to an end portion of the mirror support side plate 54 remote from the pivot point to the shaft 74. The cam follower 82 remains in pressing contact with the upper edge of the cam 80 due to the action of the spring 76, while serving to limit the clockwise movement of the mirror support 50 in coaction with the cam 80.

A lens carriage 84 carrying a lens 86 therewith is guided for reciprocation toward and away from the mirrors 58 and 60 and along the optical axis of the lens 86 by a guide rod 88 and a guide track 90, which are mounted on the bracket 68. In order to effect a change in magnification, whether going from a larger image to a smaller image, or vice versa, the lens carriage 84 will be moved by a drive mechanism (not shown) to a position which provides the desired magnification. Also mounted on the lens carriage 84 are a roller 92 and a guide member 94. An arm 96 is rigidly mounted at one end thereof on the shaft 66 and constantly engaged with the roller 92 by the action of the spring 78. When the lens carriage 84 with the lens 86 is moved toward the mirrors 58 and 60 along the guide rod 88 and guide track 90, the roller 92 will cam the arm 96 upwardly against the action of the spring 78 which is preloaded between the arm 72 and the bracket 68. The arm 96 in turn causes the shaft 66 to rotate counterclockwise about its axis entrailing the arms 70 and 72 in the same direction, thereby shifting the mirrors 58 and 60 along the optical axis of the lens 86.

Figure 3:
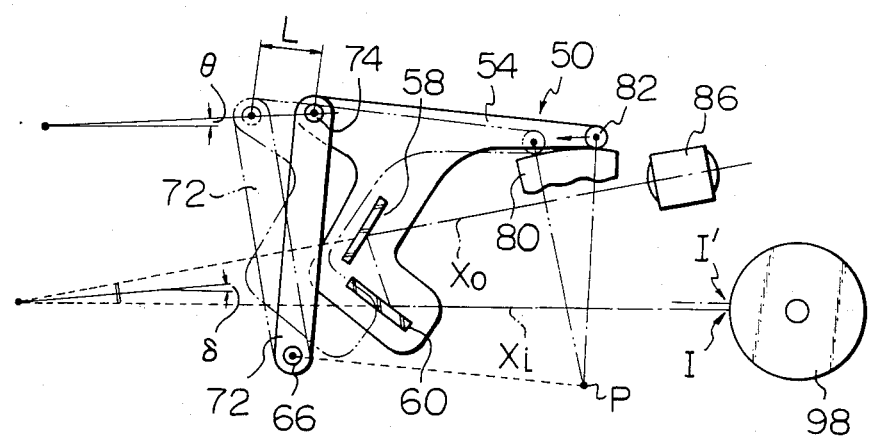
FIG. 3 is a fragmentary side elevation of the imaging device of FIG. 2, particularly showing a mirror shift mechanism.

FIG. 3 is a diagram representing a characteristic feature attainable with the construction described above. The cam 80 is so profiled as to allow the cam follower 82 on the mirror support 50 to follow a path which is defined by the translation of the path which the axis of the shaft 74 follows. Stated another way, the cam profile is such that the axis of the cam follower 82 moves angularly about a specific point P which defines a parallelogram together with the axes of the shafts 66 and 74 and the axis of the cam follower 82. With this geometric principle, the mirror support 50 is allowed to maintain its predetermined angular position even when moved from the solid line position in FIG. 3, which provides the 1:1 magnification, to the phantom line position which provides another magnification. The mirrors 58 and 60, therefore, always steer the light from the lens 86 toward a photoconductor drum 98.

In the manner described, the cam 80 is an example of a member for regulating the angular position of the mirror support 50. In this particular embodiment, a parallelogram link mechanism is defined by the contact point of the cam follower 82 with the cam 80, i.e., the axis of the cam follower 82, the pivot points of the arms 70 and 72 on the shaft 66, and the pivot point of the mirror support 50 on the shaft 74.

In FIG. 3, while the imaging device is held in the condition for the 1:1 magnification, the light reflected from the mirror 60 is incident on a predetermined image area I on the drum 98. However, in the case of a magnification other than 1:1, the image area I is shifted to I' due to the arcuate path of the shaft 74. To minimize such deviation in the image area, it is necessary to make the spacing between the axes of the shafts 66 and 74 as long as possible. Another expedient available for minimizing the deviation is setting up an equation $\theta = \delta$ where $\theta$ is an angle between the horizontal and a line connecting the axis of the shaft 74 in the 1:1 magnification position and that in the maximum displaced position for other magnifications, and $\delta$ an angle between the horizontal and a line which bisects an angle defined by an extension of the optical axis $X_0$ extending from the lens 86 to the mirror 58 and an extension of an optical axis $X_i$ extending from the mirror 60 to the drum 98. In the illustrated embodiment, the position of the shaft 66, i.e., the center of pivotal movement of the arms 70 and 72, is so selected as to make the angle $\theta$ approximately equal to the angle $\delta$.

To reduce the error in the image area on the drum 98, the arms 70 and 72 have to be designed each with a length l which is sufficiently longer than the required displacement L of the shaft 74. In this particular embodiment, the length l of the arms 70 and 72 is predetermined to be longer than $(L^2/4 + 1)$ so that the error in image area may not exceed 0.5 millimeter. Meanwhile, the distance between the shaft 74 and the cam following 82, or one side of the parallelogram, is preselected to be longer than the length l of the arms 70 and 72, or the opposite side, in order to reduce an error in translation due to an error in the distance between the cam follower and the specific point P which corresponds to the length of the arms 70 and 72. This solves the problem of the disturbance to reproduced images. Where the photoconductor is in the form of a belt, it is free from the problem concerning the image area although accompanied by deviation in timing.

In the construction shown in FIG. 2, it will be seen that the mirror support assembly 50 is bodily movable counterclockwise about the shaft 74 as indicated by an arrow C when the spring 76 is removed from the arm 70 or the side plate 52. This permits the mirrors 58 and 60 to be positioned face upward for promoting easy access to the mirrors, facilitating cleaning, replacement and other maintenance work for the mirrors.

Figure 4:
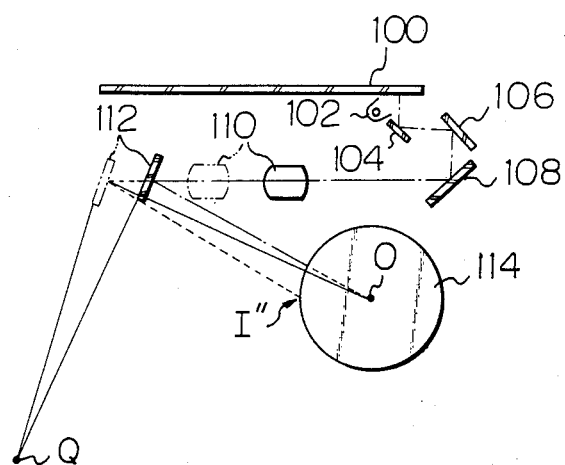
FIG. 4 is a schematic view of another copier to which the present invention is also applicable.

While the description has focused to a copier having two mirrors located between a lens and a photoconductor, the priciples of the present invention are similarly applicable to a copier having a single mirror in the location concerned as shown in FIG. 4. The copier in FIG. 4 comprises a glass platen 100, a light source 102, mirrors 104, 106 and 108 which are movable integrally with the light source 102. A lens 110 and a mirror 112 are located between the mirror 108 and a photoconductor drum 114, such that the optical axis of the lens 110 extends parallel to the platen 100. While the light source 102 scans a document on the platen 100, the light image is reflected by the mirrors 104 and 106, reflected by the mirror 108 to become parallel to the platen 100, transmitted through the lens 110, and then reflected by the mirror 112 to be focused to the drum 114.

To change the magnification, the lens 110 and mirror 112 are moved along the optical axis of the lens 110. Different from the case with two mirrors, should the mirror 112 be positioned always at a same inclination relative to the optical axis, the image light from the document would be focused to a point I" on the drum 114. This would result in a distorted unclear image due to the curvature of the drum surface.

The problem mentioned above has typically been eliminated by the use of another mirror which is movable to vary the set angle relative to the optical path. It is difficult, however, to achieve multiple magnifications with such a system. Meanwhile, because the movable angle of the mirror is quite small, a same center of rotation employed for the mirror would be located at a substantial distance from the mirror as indicated by Q in FIG. 4. Such a distance would make it difficult to render the optics compact in design.

The problems inherent in the copier of the type shown in FIG. 4 are eliminated altogether by the imaging system of the present invention. The cam 80 and arm 96 are individually configured such that the optical axis extending from the mirror 112 toward the drum 114 passes through the center O of the drum 114 to focus an image to a predetermined image area on the drum. It will be seen that when the photoconductor is in the form of a belt with a flat exposure surface, the mirror 112 needs only be maintained in a common angular position.

In the manner described, where a photoconductor comprises a drum and a single mirror is disposed in the optical path downstream of a lens, a mirror with a variable angular position is effective to direct light reflected therefrom always toward the center of the drum, if the cam profile and the like are selected to so orient the optical axis from the mirror.

Figure 5:
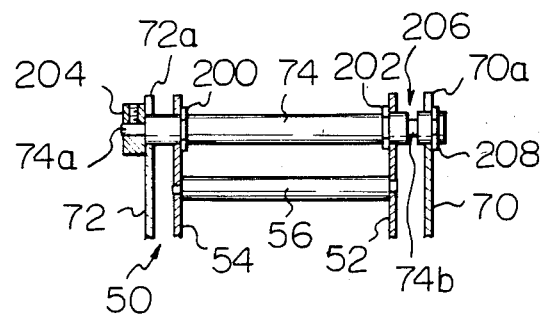
FIG. 5 is a fragmentary section of the mirror shift mechanism showing a unique mirror support arrangement.
Figure 6:
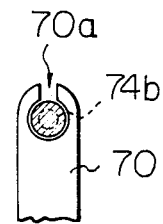
FIG. 6 is a fragmentary side elevation of the mechanism shown in FIG. 5.

Referring to FIG. 5, a unique mechanism for removably retaining the mirror support 50 is shown. The mechanism includes E-rings 200 and 202 mounted on the shaft 74 to position the mirror support 50 with respect to the thrust direction. A collar 204 is mounted on one end 74a of the shaft 74. In a channel portion 206 between the side plate 52 and the arm 70, the other end portion 74b of the shaft 74 has a reduced diameter. As best shown in FIG. 6, the arms 70 and 72 are respectively notched as at 70a and 72a where they carry the opposite ends of the shaft 74. Each of the notches 70a and 72a is dimensioned larger than the reduced diameter portion 74b of the shaft 74.

To remove the mirror support 50 bodily from the arms 70 and 72, the collar 204 is removed and the shaft 74 is moved to the right in FIG. 5 until the reduced portions 74a and 74b become aligned with the notches 70a and 72a, respectively. Then, the shaft 74 is pulled upwardly out of the notches 70a and 72a together with the mirror support 50.

The collar 204 cooperates with an E-ring 208 to limit the movement of the shaft 74 so that play of the arm 70 or 72 in the thrust direction is prevented.

In summary, it will be seen that the present invention provides a variable magnification imaging device which features low costs, ease of maintenance of mirrors and their associated elements, and ability to operate with a smaller magnitude of drive force.

Various modifications will become possible for those skilled in the art after receiving the teachings of the present disclosure without departing from the scope thereof. For example, the arm 96 cammed by the roller 92 may simply be an extension of the arm 70. The cam 80 on the bracket 68 may be replaced by an arm member which swings about the point P of the parallelogram, setting up a link mechanism having four articulations.

What is claimed is:

1. A variable magnification imaging device which defines a variable length optical path extending from an original document to a predetermined image area, said imaging device comprising:
   a mirror;
   parallelogram linkage means defined by a first axis extending perpendicular to the optical path, a second axis parallel to and rotatable about said first axis, a third axis parallel to the first axis, and a fourth axis parallel to and rotatable about said third axis, said linkage means carrying the mirror therewith; and
   drive means for driving the parallelogram linkage means to shift the mirror to a position for establishing one of a plurality of alternative magnifications.

2. The imaging device as claimed in claim 1, in which the linkage means comprises mirror support means for supporting the mirror thereon, said mirror support means being pivotable about the second axis.

3. The imaging device as claimed in claim 2, in which the mirror support means comprises a pair spaced and interconnected side plates which are pivotted to the first axis.

4. The imaging device as claimed in claim 1, in which the linkage means further comprises frame means which is pivotable about the first axis and operatively connected to the drive means.

5. The imaging device as claimed in claim 4, in which the frame means comprises a generally U-shaped frame member which defines the first axis at a base of "U" and the second axis at opposite ends thereof, said base being operatively connected to the drive means.

6. The imaging device as claimed in claim 1, in which the linkage means further comprises means for regulating an angular position of the mirror relative to the optical path.

7. The imaging device as claimed in claim 6, in which the angular position regulator means comprises a cam member rigidly mounted on a stationary member and a cam follower mounted on the linkage means, said cam and cam follower defining the fourth axis at interengaged points thereof.

8. The imaging device as claimed in claim 6, in which the angular position regulator means comprises an arm member which spans the third and fourth axes.

9. The imaging device as claimed in claim 1, further comprising a lens carriage loaded with a lens and disposed in the optical path in alignment with the mirror such that an image from said lens becomes incident on the mirror, said lens carriage being movable parallel to the optical path.

10. The imaging device as claimed in claim 9, in which the linkage means further comprises frame means which is pivotable about the first axis and operatively connected to the drive means.

11. The imaging device as claimed in claim 10, in which the drive means comprises a roller rotatably mounted on the lens carriage, and an arm member extending from the frame means to be cammed by said roller in response to a movement of the lens carriage.

12. A variable magnification imaging device which defines a variable length optical path extending from an original document to a predetermined image area, said imaging device comprising:

a member swingable toward and away from a predetermined position about a first axis which is perpendicular to the optical path, said swingable member being constantly biased toward said predetermined position;

a mirror support assembly pivotally supported by said swingable member and constantly biased substantially in the same direction as the swingable member about a second axis which is parallel to the first axis, said mirror support assembly supporting a mirror for reflecting the light from the original document toward the image area; and means for regulating an angular position of the mirror support assembly relative to the optical path;

whereby the swingable member swings to move the mirror on the mirror support assembly along the optical path and in a regulated angular position to a location which establishes selected one of a plurality of alternative magnifications.

13. The imaging device as claimed in claim 12, in which the angular position regulator means comprises a cam fixed in position and a cam follower mounted on the mirror support assembly, said cam and cam follower defining a third axis at interengaged points thereof.

14. The imaging device as claimed in claim 13, in which a parallelogram linkage is defined which includes the first, second and third axes.

* * * * *